United States Patent [19]

Cecchini

[11] 4,426,586
[45] Jan. 17, 1984

[54] DRAG RESPONSIVE REGULATED VOLTAGE POWER GENERATION

[75] Inventor: Albert B. P. Cecchini, Philadelphia, Pa.

[73] Assignee: Warren Erection Co., Inc., Warren, Pa.

[21] Appl. No.: 255,501

[22] Filed: Apr. 20, 1981

[51] Int. Cl.³ .............................................. F03D 7/04
[52] U.S. Cl. ......................................... 290/44; 290/55
[58] Field of Search .................... 290/44, 55; 322/35; 310/209

[56] References Cited

U.S. PATENT DOCUMENTS

| | | | |
|---|---|---|---|
| 2,453,523 | 11/1948 | McCullough | 310/209 X |
| 2,484,197 | 10/1949 | Veldhuis | 322/35 X |
| 2,503,017 | 4/1950 | Wisman | 310/209 UX |
| 3,525,005 | 8/1970 | Beyers | 310/209 X |

Primary Examiner—J. V. Truhe
Assistant Examiner—W. E. Duncanson, Jr.
Attorney, Agent, or Firm—Woodcock, Washburn, Kurtz, Mackiewicz & Norris

[57] ABSTRACT

Means are provided for the generation of electricity from moving fluids. More particularly, generators of the type adapted for extraction of power from moving fluids comprising blade means mounted on a rotatable shaft, coil means mounted on said shaft, and field means separated from said coil means by a spatial gap are improved by mounting said shaft slidably with respect to said field means and by providing resilient means for maintaining said gap at a minimum value whereby the shaft may be caused to move axially in response to drag between said moving fluid and said blade means whereby the value of said gap is varied in response to said drag resulting in a regulated voltage.

24 Claims, 1 Drawing Figure

DRAG RESPONSIVE REGULATED VOLTAGE POWER GENERATION

BACKGROUND OF THE INVENTION

1. Field of the Invention

This invention concerns novel means for the production of electricity from moving fluids. More particularly, this invention is directed to wind and/or water power generation employing drag responsive constant voltage generating devices.

The generation of electric power from moving fluids such as wind or water has achieved prominence in recent years. In such generation, the moving fluid is generally caused to impel a set of rotors or blades which are connected to a rotatable shaft. The shaft is fixedly associated with a set of coil means which are held in juxtaposition with a means for generating a magnetic field. The "cutting" of the magnetic field lines thus provided by the rotating coils engenders an electric current in the coils. Those skilled in the art will appreciate that, in the alternative, the field generation means may be caused to rotate while holding the coil stationary to result in a similar generation of electric current in the coils. Similarly, it is known to provide a plurality of field means and coil assemblies to multiply the power generation capacity of such devices.

Those skilled in the art will appreciate that the voltage generated by such a generation system will be proportional to the angular velocity of the rotating shaft and, to the coil means or field means attached thereto. It will similarly be appreciated that the resulting voltages will be inversely proportional to the linear distance between each set of coils and the juxtaposed field means.

In prior generating systems, it has been found to be impractical to harness the energy available in moving fluids over a full range of velocities. This is so because present voltage and phase control equipment can not conveniently handle wide variations in input voltage. Accordingly, such equipment is conventionally been designed for the control of fluid generation electrical output over higher speed ranges, where most efficient use of the available energy in moving fluids may be accomplished. Thus, low speed operations of such generation means are usually deemed to be impractical.

OBJECTS OF THE INVENTION

It is an object of this invention to provide means for the generation of electricity from moving fluids. It is another object to provide such means for the generation of electricity which are responsive to fluctuations in the velocity of the motivating fluids. It is yet another object to provide such means which is responsive to the drag existant between moving fluids and the blade means of the generating device to alter the juxtaposition between field means and coil means. It is yet another object of this invention to provide such generating means which regulates the distance between field means and coils to provide regularity in the voltage output of the generating device. These and other objects are accomplished through the employment of one or more embodiments of the present invention.

SUMMARY OF THE INVENTION

Figure 1:
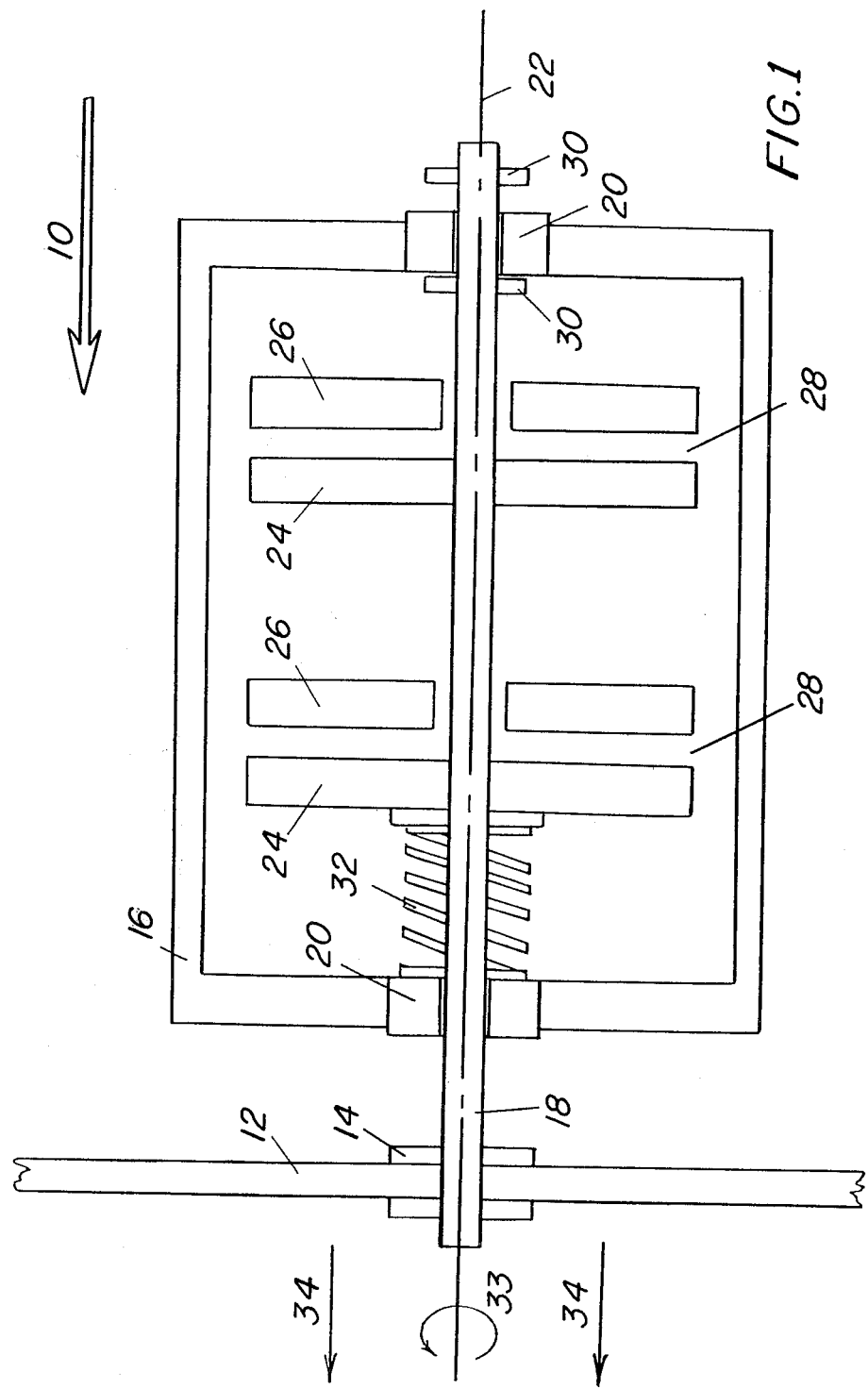
FIG. 1 is a crosssectional schematic of a generating device according to one embodiment of this invention.

The present invention comprises an improvement in generators which are adapted for the extraction of power from moving fluids. Such generators comprise blade means mounted on a rotatable shaft, stationary field means, and coil means mounted on said shaft in juxtaposition to said field means. The improvement comprises mounting said shaft slidably and resiliently with respect to the field means whereby said shaft moves axially in response to drag between said moving fluid and the blade means to alter the juxtaposition of the field means and the coils in response to changes in the drag. In an alternative embodiment, the field means is mounted on the rotatable shaft while the coil means is held stationary in juxtaposition thereto. According to yet another embodiment, the shaft is adapted to be movable servomechanically with respect to the field means, said servomechanism being responsive to one or more parameters such as the velocity of the moving fluid, the angular velocity of the shaft, or the output voltage of the generator.

DETAILED DESCRIPTION OF THE INVENTION

FIG. 1 represents a "down wind" generating device having blade means 12 disposed down wind with respect to a housing portion 16 housing the components of the generator responsible for the generation of electricity. Accordingly, blade means 12 are fixedly mounted via mounting means 14 on shaft 18. Shaft 18 is mounted in bearing means 20 to the housing 16. The relationship of shaft 18 to the bearings 20 is such that said shaft is both rotatable about its axis 22 and slidable along said axis relative to the housing 16 and to those components of the generator which are fixedly mounted with respect to the housing. The generating device further comprises coil means 24 which are fixedly mounted to the shaft 18. Coil means 24 are located in juxtaposition to field means 26 which are mounted fixedly with respect to the housing 16. In FIG. 1, two sets of coil means and field means are illustrated. It will be understood that from one to a large plurality of such sets of coil means and field means may be provided. The coil means and the field means are juxtaposed in such a fashion that a gap 28 exists between them. The minimum and maximum values of gap 28 are defined by virtue of excursion limit means 30. The minimum value is normally maintained by resilient means 32 urging one of the excursion limit means 30 against the housing 16.

It will be appreciated that the interaction of wind (or other moving fluid) 10 and blade means 12 will cause a combination of mechanical forces to be exerted upon shaft 18. Accordingly, a combination of angular and axial forces will be imposed upon the shaft by such interaction. The angular forces will cause a rotation of shaft 18 and, concomitantly, coil means 24 with respect to the housing 16 and field means 26. This angular velocity is implied by reference numeral 33. At the same time, due to the imperfect ability of blade means 12 to translate wind 10 into angular velocity 33, "drag" 34 will be exerted in a down wind, axial direction upon shaft 18. This drag will oppose resilient means 32 and tend to increase the magnitude of gap 28. As the velocity of the wind increases, the value of the drag 34 exerted axially on shaft 18 will increase. Accordingly, magnitude of gap 28 will similarly increase. The magnitude of this increase is a function of wind velocity and the spring constant of resilient means 32.

It will be appreciated that the foregoing description of the invention describes generator means schematically. Those skilled in the art will appreciate that numerous modifications to the schematic generator thus described may be employed without deviating from the invention. Accordingly, it may be preferred to employ gearing means as a constituent part of the rotatable shaft. Similarly, brake means, blade feathering means, and other known modifications may be employed.

As has been explained above, the value of the voltage generated in coil means 24 is a function of the angular velocity of the coil means and an inverse function of the gap distance 28 between the coil means and the field means 26. Accordingly, it will be appreciated that the voltage generated by such a generation system will tend to be regulated by the of velocity of the wind (or other moving fluid). Accordingly, it is now possible to operate such generating devices over much broader wind velocity ranges than was heretofore thought possible. Accordingly, at low wind speeds, the gap 28 is a minimum, the magnetic field apparent at coil means 24 is a maximum, and the output voltage is maximized for the given wind speed and angular velocity 33. As the wind speed increases, the gap distance 28 similarly increases, thus decreasing the effective magnetic field strength apparent at coil means 24. This decreasing field strength tends to counteract the increasing angular velocities experienced at higher absolute wind speeds and results in a regulated production of electric voltage.

It will be appreciated that, by the placement of resilient means 32 at the end of housing 16 away from blade means 12, and by modifying the positions of other components such as coil means 24 and field means 26 an "up wind" generator may be designed having similar beneficial properties. Additionally, such devices may be employed in generating electricity from other moving fluids such as water.

According to a preferred embodiment, servomechanical means are substituted for resilient means 32. In such embodiments, the servomechanical means are employed to vary the gap distance 28 responsive to one or more of several parameters. Thus, the gap distance 28 may be varied depending upon the wind speed 10, the angular velocity of the shaft 33, output voltage, or numerous other parameters. Accordingly, it is preferred to provide sensing means for assessing the value of at least one preselected parameter such as wind (or water) velocity and control means mechanically or electronically connected to said sensing means. Servomechanical means adapted to vary the gap distance 28 by sliding the shaft 18 axially with respect to the housing 16 is also provided. The servomechanical means is adapted to be responsive to the value of the preselected parameter as sensed by the sensing means via the control of the control means. In a preferred embodiment, the sensing, control and servomechanical means form a closed system or "feedback loop."

It will be appreciated that numerous other embodiments of this invention also may be designed. Thus, another embodiment comprises a generator wherein the rotating coil (or field) means is disposed radially within the stationary field (or coil) means which forms a cylindrical shell thereabout. Thus, movement of the shaft in response to drag or another parameter causes an axial movement of the rotating coil (or field) means partially into and out of the stationary cylinder thus to vary the effective interaction of field means and coil means to establish a voltage. In this embodiment, either resilient means or servomechanical means may be employed to effect such axial movement and concomitant voltage alteration.

The invention has been described in regard to certain embodiments, those skilled in the art will appreciate that numerous other embodiments are also encompassed by this invention which is measured more precisely by the following claims.

What is claimed:

1. In a generator of the type adapted for extraction of power from a moving fluid comprising:
   blade means mounted on a rotatable shaft,
   coil means mounted on said shaft, and
   field means separated from said coil means by a spatial gap,
   the improvement comprising:
   mounting said shaft slidably with respect to said field means, and
   providing resilient means for maintaining said gap at a minimum dimension,
   whereby said shaft moves axially in response to drag between said moving fluid and said blade means;
   whereby the dimension of said gap is varied in response to said drag, said dimension being increased in response to increases in said drag.

2. The improvement of claim 1 wherein said resilient means is a spring.

3. The improvement of claim 1 wherein electricity is provided at a voltage which is substantially regulated by the velocity of the moving fluid.

4. In a generator of the type adapted for extraction of power from a moving fluid comprising:
   blade means mounted on a rotatable shaft,
   field means mounted on said shaft, and
   coil means separated from said coil means by a spatial gap,
   the improvement comprising:
   mounting said shaft slidably with respect to said coil means, and
   providing resilient means for maintaining said gap at a minimum dimension,
   whereby said shaft moves axially in response to drag between said moving fluid and said blade means,
   whereby the dimension of said gap is varied in response to said drag, said dimension being increased in response to increases in said drag.

5. The improvement of claim 4 wherein said resilient means is a spring.

6. The improvement of claim 4 wherein electricity is provided at a voltage which is substantially regulated by the velocity of the moving fluid.

7. In a generator of the type adapted for extraction of power from a moving fluid comprising:
   blade means mounted on a rotatable shaft,
   coil means mounted on said shaft, and
   field means separated from said coil means by a spatial gap,
   the improvement comprising:
   mounting said shaft slidably with respect to said field means, and
   providing servomechanical means for moving said shaft axially in response to a preselected parameter,
   whereby the dimension of said gap is varied in response to the value of said parameter, said dimension being increased in response to increases in the velocity of said fluid.

8. The improvement of claim 7 wherein said parameter is fluid velocity.

9. The improvement of claim 7 wherein said parameter is output voltage.

10. The improvement of claim 7 wherein said parameter is angular velocity of said shaft.

11. The improvement of claim 7 wherein electricity is provided having a voltage which is substantially regulated by the velocity of said moving fluid.

12. In a generator of the type adapted for extraction of power from a moving fluid comprising:
blade means mounted on a rotatable shaft,
field means mounted on said shaft, and
coil means separated from said field means by a spatial gap,
the improvement comprising:
mounting said shaft slidably with respect to said coil means, and
providing servomechanical means for moving said shaft axially in response to a preselected parameter, whereby the dimension of said gap is varied in response to the value of said parameter, said dimension being increased in response to increases in the velocity of said fluid.

13. The improvement of claim 12 wherein said parameter is the velocity of the moving fluid.

14. The improvement of claim 12 wherein said parameter is output voltage.

15. The improvement of claim 12 wherein said parameter is angular velocity of said shaft.

16. The improvement of claim 12 wherein electricity is provided having a voltage which is substantially independent of the velocity of said moving fluid.

17. A process for the production of electricity from a moving fluid comprising:
providing a generator having blade means mounted on a rotatable shaft,
coil means mounted on said shaft, and
field means separated from said coil means by a spatial gap, said shaft being mounted slidably with respect to said field means,
sampling the value of preselected parameter, and
varying the value of said gap in response to the value of said parameter, said gap value being increased in response to increases in the velocity of said fluid.

18. The process of claim 17 wherein said preselected parameter is the velocity of said moving fluid.

19. The process of claim 17 wherein said preselected parameter is angular velocity of said shaft.

20. The process of claim 17 wherein the preselected parameter is output voltage.

21. A process for the production of electricity from a moving fluid comprising:
providing a generator having blade means mounted on a rotatable shaft,
field means mounted on said shaft, and
coil means separated from said field means by a spatial gap, said shaft being mounted slidably with respect to said coil means,
sampling the value of a preselected parameter, and
varying the value of said gap in response to the value of said parameter, said gap value being being increased in response to increases in the velocity of said fluid.

22. The process of claim 21 wherein said preselected parameter is the velocity of said moving fluid.

23. The process of claim 21 wherein said preselected parameter is angular velocity of said shaft.

24. The process of claim 21 wherein the preselected parameter is output voltage.

* * * * *